United States Patent
Ricker (10) Patent No.: US 8,408,867 B2
(45) Date of Patent: Apr. 2, 2013

(54) MULTI DIRECTIONAL AUGMENTER AND DIFFUSER

(76) Inventor: Jonathan C. Ricker, Shrewsbury, MA (US)

( * ) Notice: Subject to any disclaimer, the term of this patent is extended or adjusted under 35 U.S.C. 154(b) by 0 days.

(21) Appl. No.: 13/294,522

(22) Filed: Nov. 11, 2011

(65) Prior Publication Data

US 2012/0104759 A1    May 3, 2012

Related U.S. Application Data (63) Continuation-in-part of application No. 12/319,484, filed on Jan. 8, 2009, now abandoned, and a continuation-in-part of application No. PCT/US2010/038947, filed on Jun. 17, 2010.

(60) Provisional application No. 61/010,691, filed on Jan. 10, 2008, provisional application No. 61/269,043, filed on Jun. 20, 2009, provisional application No. 61/273,740, filed on Aug. 8, 2009, provisional application No. 61/284,515, filed on Dec. 21, 2009, provisional application No. 61/336,206, filed on Jan. 19, 2010, provisional application No. 61/342,658, filed on Apr. 15, 2010, provisional application No. 61/572,693, filed on Jul. 20, 2011, provisional application No. 61/574,143, filed on Jul. 28, 2011, provisional application No. 61/574,225, filed on Jul. 28, 2011.

(51) Int. Cl.
*H02P 9/04* (2006.01)

(52) U.S. Cl. ............. 415/119; 415/151; 290/44; 290/55

(58) Field of Classification Search .................. 415/119, 415/151, 183; 290/44, 55
See application file for complete search history.

(56) References Cited

U.S. PATENT DOCUMENTS

| | | | | |
|---|---|---|---|---|
| 4,021,135 A | * | 5/1977 | Pedersen et al. | 415/208.2 |
| 4,285,481 A | * | 8/1981 | Biscomb | 244/33 |
| 4,406,584 A | * | 9/1983 | Stepp | 416/41 |
| 4,616,973 A | * | 10/1986 | Souchik, Jr. | 415/4.1 |
| 4,695,736 A | * | 9/1987 | Doman et al. | 290/44 |
| 7,256,512 B1 | * | 8/2007 | Marquiss | 290/55 |
| 2010/0236716 A1 | * | 9/2010 | Hisha et al. | 156/331.6 |
| 2012/0014794 A1 | * | 1/2012 | Bailey | 416/52 |

* cited by examiner

*Primary Examiner* — Gary F. Paumen
(74) *Attorney, Agent, or Firm* — Brian M. Dingman (57) ABSTRACT

This invention relates to an augmenter system for the increase of power generation primarily used for utilizing wind energy. The augmenter system includes an augmenter having a plurality of walls, such as flexible walls, connected to each other with supporting horizontal elongated members. The augmenter is used in conjunction with a blade system and an air flow regulation or furling system to achieve optimal power output. The augmenter includes a relatively lightweight, low cost flexible wall structure to enhance an air flow into impact impellers associated with the blade system. In one arrangement, the blade system defines a swept area with a height to diameter ratio of greater than four. In one arrangement, the blade system defines a swept area with a height to diameter ratio of greater than ten.

19 Claims, 12 Drawing Sheets

MULTI DIRECTIONAL AUGMENTER AND DIFFUSER

CROSS REFERENCE TO RELATED APPLICATION

This application is a continuation-in-part of U.S. patent application Ser. No. 12/319,484 filed on Jan. 8, 2009 which is based upon and claims the benefit of U.S. Provisional Application No. 61/010,691, filed on Jan. 10, 2008, the entire contents of which are incorporated by reference herein. This application is also a continuation-in-part of International Application No. PCT/US2010/038947, filed on Jun. 17, 2010, which is based upon and claims benefit to U.S. Provisional Application No. 61/269,043, filed on Jun. 20, 2009, U.S. Provisional Application No. 61/273,740, filed Aug. 8, 2009, U.S. Provisional Application No. 61/284,515, filed on Dec. 21, 2009, U.S. Provisional Application No. 61/336,206, filed on Jan. 19, 2010, and U.S. Provisional Application No. 61/342,658, filed on Apr. 15, 2010, the entire contents of which are incorporated by reference herein. This application also claims the benefit of U.S. Provisional Application No. 61/572,693, filed on Jul. 20, 2011, U.S. Provisional Application No. 61/574,143, filed on Jul. 28, 2011, and U.S. Provisional Application No. 61/574,225, filed on Jul. 28, 2011, the entire contents of which are incorporated by reference herein.

FIELD

Embodiments of the invention relates to an adjustable or flexible augmenter configured to utilize wind energy for the generation of power.

BACKGROUND

Embodiments of the invention relate generally to the field of wind energy, and more particularly to the use of augmenters to enhance air velocity into the blade or impact impeller area and augmenter with walls, such as flexible walls.

With considerable attention toward renewable energy, the efficient use of wind power and the capturing of increased energy from the winds has received much consideration. One attempt to harness increased wind energy power is disclosed in U.S. Pat. No. 4,070,131 wherein ambient wind is admitted into a vertical structure producing a vortex flow and corresponding low pressure area for enhancing air flow across a wind turbine.

U.S. Pat. No. 4,031,405 discloses a horizontal turbine with a wind enhancement structure which adjusts to the direction of wind for optimizing the wind velocity.

Other methods have been proposed for directing the wind and increasing its effects against a turbine blade or impact impeller.

Wind turbines utilize a rotor for converting the energy of the air stream into rotary mechanical power as a power conversion device from the wind. Wind machines can take advantage of a free and inexhaustible power source of mechanical power for various purposes including driving an electrical generator. In generating large amounts of power, conventional turbines had large rotors in order to generate a sufficient amount of energy in order to make it worthwhile for having a generator in order to produce electricity. Unfortunately, the large rotors are expensive because the stress on the rotors increases dramatically as the diameter increases. Conventional turbines had to increase the diameter of the blades in order to capture more energy generated by the moving air impacting the blades. This increase in the diameter of blades for producing substantial power can increase the cost of other items in the turbine other than the blades. Large blades which have not been properly produced can create structural stress and fatigue problems for the gearbox, tower, and the system that turns the generator toward the optimal wind direction.

In the past, wind turbines were supported by a single tower and guy wires in many cases leading to many vibration and frequency related problems. The blades of vertical axis turbines were large and could be limited in the design and the materials used. For example aluminum extrusion and fiberglass pultrusion were used in the two most serious commercial applications of vertical axis turbines. Due to the large size of the fiberglass blades, the strength was limited in order to bend the blade at the place of installation. The aluminum blades could not form a true troposkein shape. The blades had to be made of significant length and the available extrusion equipment is not available. The patents of both serious commercial prior applications of vertical axis technology are described in "Vertical Axis Wind Turbine" U.S. Pat. No. 4,449,053 and "Vertical Axis Wind Turbine with Pultruded Blades" in U.S. Pat. No. 5,499,904. However, the fatigue factor in blades using those materials suffered from structural stress caused by cyclical loads on vertical blades. The lift forces push the blades back and forth as they rotate. The more popular horizontal wind turbines are not subject to this cyclical stress occurring many thousand of times per day. The construction and installation was complex and costly.

The vertical blades in prior technology could not place the rotor high enough above the ground in order to a turbulence leading to long term structural problems.

In other prior technology, the swept area of the turbine had an aspect ratio of less than four due to construction limitations. The aspect ratio, the swept area height to diameter, is preferred to be high for better efficiency. This occurs when a tall and thin rotor maintains a large swept area and a high RPM. As a result, the moment of inertia is reduced and less energy is spent on its own motion.

In prior blade technology, two or more blades per shaft section, were used in order to achieve proper blade balance. The designing of one blade per shaft section was expensive and had imbalance problem in past turbines there were numerous attempts toward developing a horizontal one bladed turbine.

SUMMARY

One object of embodiments of the invention is to create an augmenter system to capture, and funnel, the wind into its Multi-Axis Turbo system (MAT) units to dramatically increase the power output without a proportional increase in structural size and cost.

Another object of embodiments of the invention is the use of less material and the ability to use less costly material which would help bring the kilowatt/hour cost down significantly.

Another object of embodiments of this invention is the use of an augmenter system with integral dump panels and top panel lift systems to minimize damage during wind gusts.

A further object of embodiments of this invention is the use of side wall dump panels and top panel lift systems to minimize the pressure spikes in the augmenter during extreme wind events. These side dump panels will swing open when sufficient pressure differences exist between the inside and outside of the augmenter. The top panel lift system provides a hinge that allows the suspension cable to lift above the next panel to vent air velocity to the outside of the augmenter.

The side dump panels and top panel lift system allow the system to be built with lighter components, reducing the cost of the augmenter system. The panels and lift system also reduce the potential damage to the panels, suspension cables, and poles during extreme wind events, decreasing maintenance costs during the life time of the MAT wind power plant and augmenter system.

Every site has extreme wind events during some point of the annual weather cycle. These wind events provide an opportunity for the MAT wind power plant design to produce the maximum amount of power that the traditional, horizontal axis generators cannot harness, including damage to traditional augmenter systems.

A further object of embodiments of the invention is to provide more durable blades by resolving structural stress problems in wind turbines with large blades.

Another object of embodiments of the invention is to reduce manufacturing cost by using more but smaller components instead of larger and fewer components.

A further object of embodiments of the invention is to provide longer life for the bearing by reducing structural and mechanical stress.

Yet another object of embodiments of the invention is to provide a more efficient turbine with reductions in the moment of inertia and easier self starting capability.

Still yet another object of embodiments of the invention is to provide a more durable blade design by overcoming imbalance problem of larger blades.

Another object of embodiments of the invention is to allow stiffer and more rigid blades by making them smaller.

A further object of embodiments of the invention is to provide an easier construction method. Yet another object of embodiments of the invention is to allow for construction with standard parts which do not need to be custom made with the exception of the mass produced blades. The augmenter parts and the preferred embodiment of wind power plant can be supplied by several suppliers to avoid supplier backlog problems.

Still yet another object of embodiments of the invention is to enhance structural support with an augmenter. Another object of the invention is to provide weather protection and additional structural support with its roof.

Other objects and advantages of the present embodiments of the invention will become apparent from the following descriptions, taken in connection with the accompanying drawings, wherein, by way of illustration and example, an embodiment of the present invention is disclosed.

Embodiments of the invention provides an augmenter system to capture, and funnel, the wind into wind power plants to dramatically increase the power output without a proportional increase in structural size and cost. This is a major development bringing the kilowatt/hour cost down significantly.

In one arrangement, the augmenter system is configured as a canvas panel system with integral dump panels and top panel lift systems to minimize damage during wind gusts. Further, the invention has developed side wall dump panels and top panel lift systems to minimize the pressure spikes in the augmenter during extreme wind events. These side dump panels will swing open when sufficient pressure differences exist between the inside and outside of the augmenter. The top panel lift system provides a bracket that allows the suspension cable to lift above the next panel to vent air velocity to the outside of the augmenter.

The side dump panels and top panel lift system allow the system to be built with lighter components, reducing the cost of the augmenter system. The panels and lift system also reduce the potential damage to the canvas panels, suspension cables, and poles during extreme wind events, decreasing maintenance costs during the life time of the wind power plant and augmenter system.

Every site has extreme wind events during some point of the annual weather cycle. These wind events provide an opportunity for the wind power plant design to produce the maximum amount of power that the traditional, horizontal axis generators cannot harness, including damage to traditional augmenter systems.

One arrangement of the augmenter system provides a wind power producing means comprising an external upper covering or roof, a tower structure comprising a plurality of vertical elongated members connected to each other with supporting horizontal elongated members like a large lattice tower section, and a plurality of smaller blades. The blades are connected to a shaft or any other rotation means which is connected to a tower structure with a plurality of shafts. The blades or any form of impact impellers are connected to the shaft or any rotation means creating an aspect ratio or a swept area with a height to diameter ratio of greater than four. Each shaft is connected to a generator near the ground. The structure support for the blades or impact impellers and shafts or rotation means are not individually supported in itself. The frame or tower structure supports the shafts collectively. Embodiments of the invention include a vibration absorber or bushiness between the bearings or moving parts and the support structure. The plurality of small blades with a simple design of no twist and taper are connected a plurality of generators with each generator connected to each shaft or rotation means of the invention's plurality of shafts or rotation means. A single blade or impact impeller at each section of the rotation means could be placed at different positions or angles along the axis for reducing torque ripple.

An advantage of embodiments of the invention is to reduce the cost of producing the turbine systems by allowing cheaper material. The shape preferably of an airfoil can be added to the structure in order to increase the air velocity approaching the turbine which would result in greater power output. A roof can be configured from any cost effective material, including relatively inexpensive plastic, placed above the wind turbine structure including any wind power system. The roof on this four legged tower structure could be curved into a shape which would increase the air velocity approaching a wind turbine unit. Less vibrations and better protection would allow the use of relatively less expensive material in the wind system. We can use cheap wooden and less treated elongated structures which is also easier to construct. We would also have the ability to use cheaper materials for other parts like the turbines and bearings as examples. Another advantage of the roof is to prevent excess wear and tear from the rain and snow from falling onto the turbine system and causing rapid deterioration including warping and rotting.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An augmenter system is configured to funnel airflow, such as wind, into a wind power plant to increase the power output produced by the power plant without a proportional increase in structural size and cost of the augmenter system, thereby reducing the overall kilowatt/hour cost.

Figure 1:
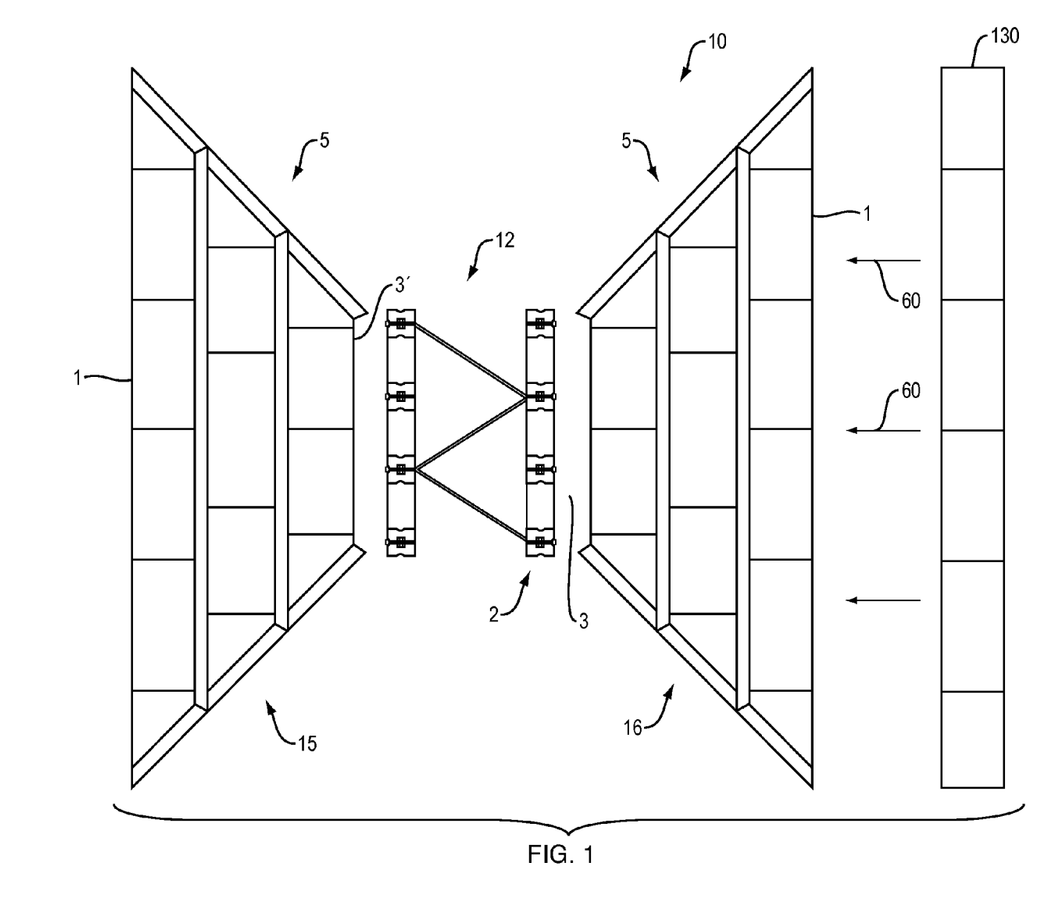
FIG. 1 illustrates a top view of an augmenter system.
Figure 7:
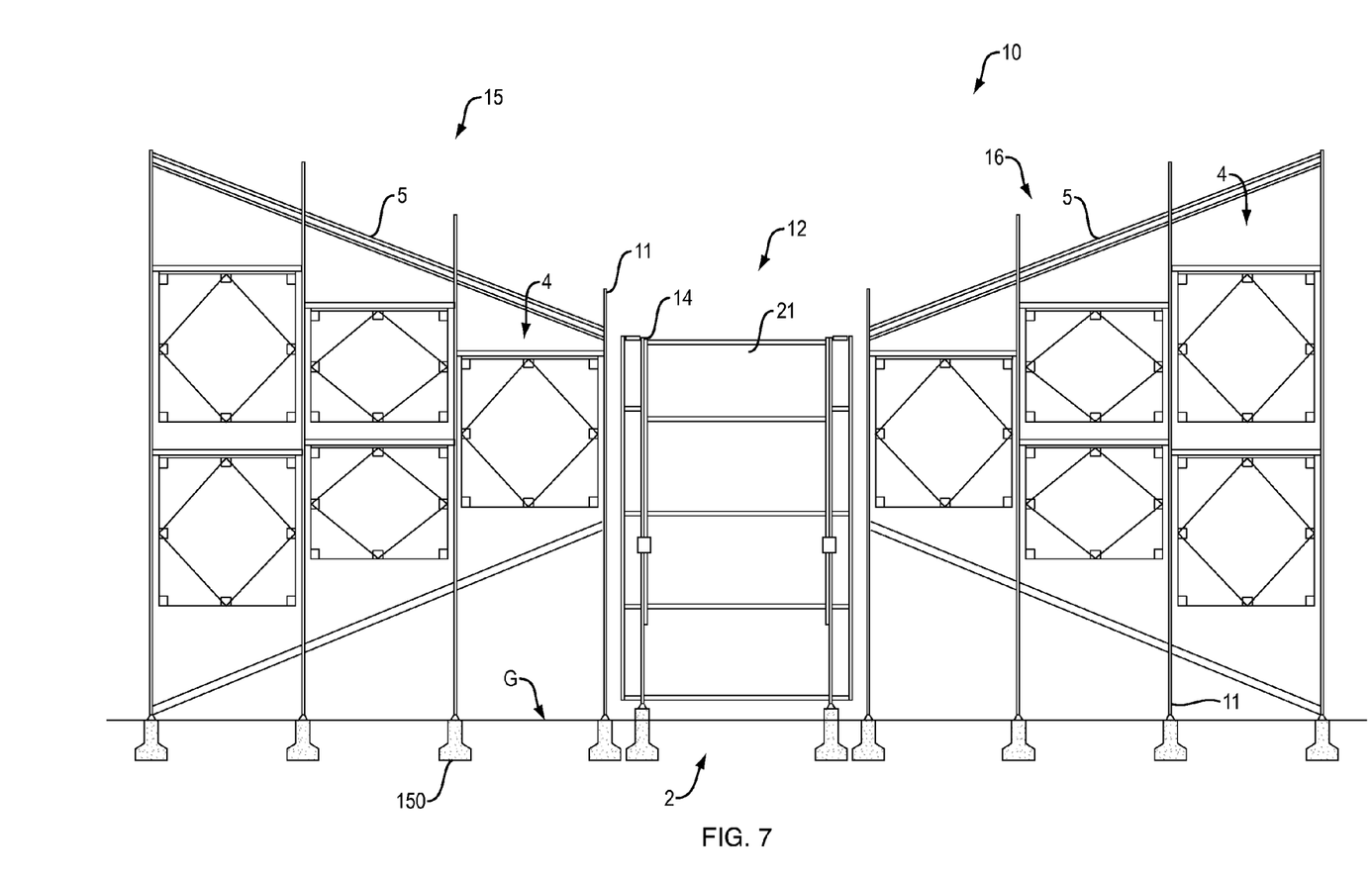
FIG. 7 is a side view of the augmenter system of FIG. 1.

FIGS. 1 and 7 illustrate an augmenter system 10 having first and second augmenter elements 15, 16. Each of the augmenter elements 15, 16 includes a frame 11 which carries a set of walls, such as top panel lift systems 5-1, 5-2, 5-N, collectively top panel lift systems 5, and side dump panels 4 and which is secured to the ground G. While the frame can be secured to ground G in a variety of ways, in one arrangement, the frame is secured using vibration absorbing foot elements 150.

The augmenter system 10 also includes a blade system 12 disposed in a blade area 2. Each of the augmenter elements 15, 16, defines a wind path that is configured to direct wind toward the blade system 12, depending upon the direction of the wind flow relative to the augmenter system 10. For example, as shown in FIG. 1, wind flows along direction 60 moves from an inlet area 1 of the augmenter system 10 (e.g., an inlet area of the second augmenter element 16), through the blade area 2, and eventually to an opposing inlet area 1' of the augmenter system 10 (e.g., an inlet area 1' of the first augmenter element 15). The low velocity created near outlet 3 allows for the acceleration of airflow through blade area 2. The wind can flow between the areas perpendicular to the wind inlet area 1 and the outlet area 3 of the second augmenter element 16, the blade area 2, and the wind inlet area 1' and the wind outlet area 3' of the first augmenter element 15. It should be noted that the augmenter system 10 can also capture wind flowing substantially from a direction opposing direction 60 (i.e. from an inlet area 1' of the first augmenter element 15 to the outlet area 3' of the first augmenter element 3', through the blade area 2, and to the opposing outlet area 3 and inlet area 1 of the second augmenter element 16.

In one arrangement, each top panel lift system 5 and each integral side dump panel 4 are configured to minimize damage during wind gusts and to minimize the pressure spikes in the augmenter during extreme wind events. For example, with reference to FIG. 2, each of the side dump panels 4 is secured to the frame 11 with a corresponding hinge 17. During operation, when a sufficient pressure differences exist between the inside and outside of the augmenter system 10, one or more of the side dump panels 4 can pivot on its corresponding hinge 17 to swing away from the frame 11 (i.e., along a direction from out of the page) to vent the wind away from the blade area 2. Additionally, in FIG. 3, each top panel lift system 5 includes a set of top panel lift system sections 6 where each section 6 includes a hinge 19 coupled to the frame 11. During operation as relatively high velocity air flows through the augmenter system 12, the hinge 19 allows a leading frame edge 7, such as a suspension cable 7, to lift above the next panel section 6 to vent air to the outside of the augmenter system 10 to reduce the air velocity.

In one arrangement, the walls of the augmenter elements 15, 16, such as the top panel lift systems 5 and side dump panels 4, are manufactured from flexible, lightweight, and durable material to reduce the cost of the augmenter system 10. The flexible, lightweight, and durable material also reduces the potential damage to the top panel lift systems 5, the side dump panels 4, leading frame edges 77, and frame 11 during extreme wind events and decreases maintenance costs during the life time of the MAT wind power plant and augmenter system 10. For example, in one arrangement the walls of the augmenter elements 15, 16, such as the top panel lift systems 5 and side dump panels 4 are formed as canvas panels from a canvas material. The walls of the augmenter elements 15, 16, such as the top panel lift systems 5 and side dump panels 4 can also be manufactured from a shrink wrap material, from injection molded plastic or injection molded foam from an inflatable structure, or from a sheet metal skin.

Figure 2:
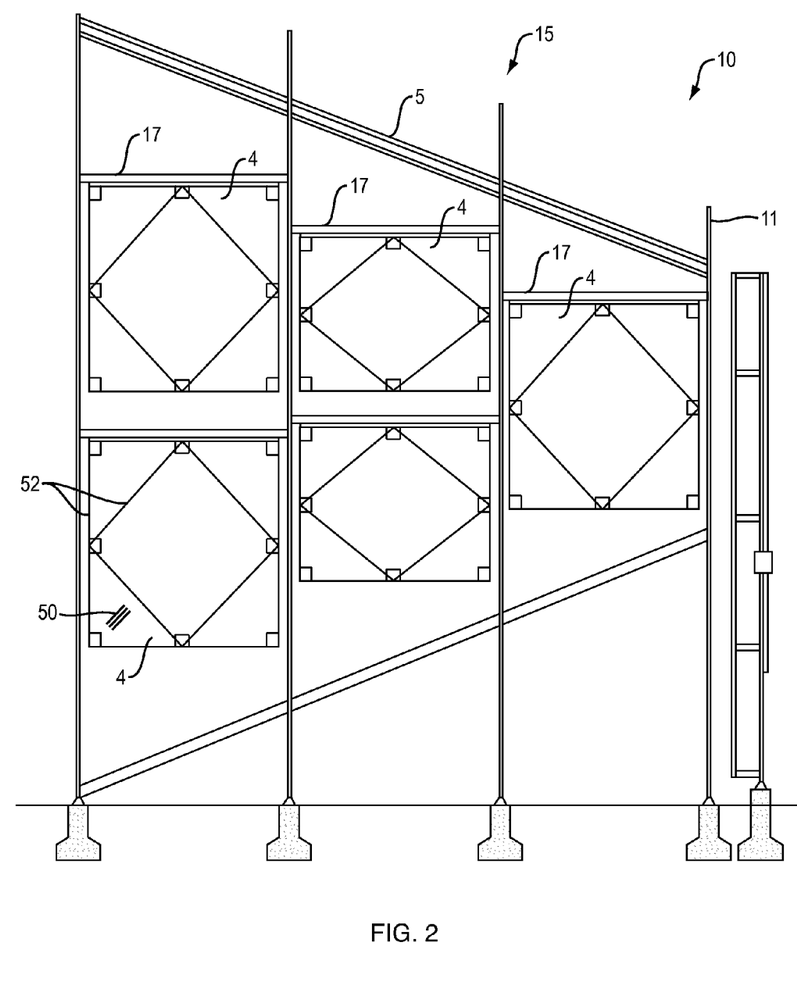
FIG. 2 illustrates a side view of dump panels of the augmenter system of FIG. 1.
Figure 3:
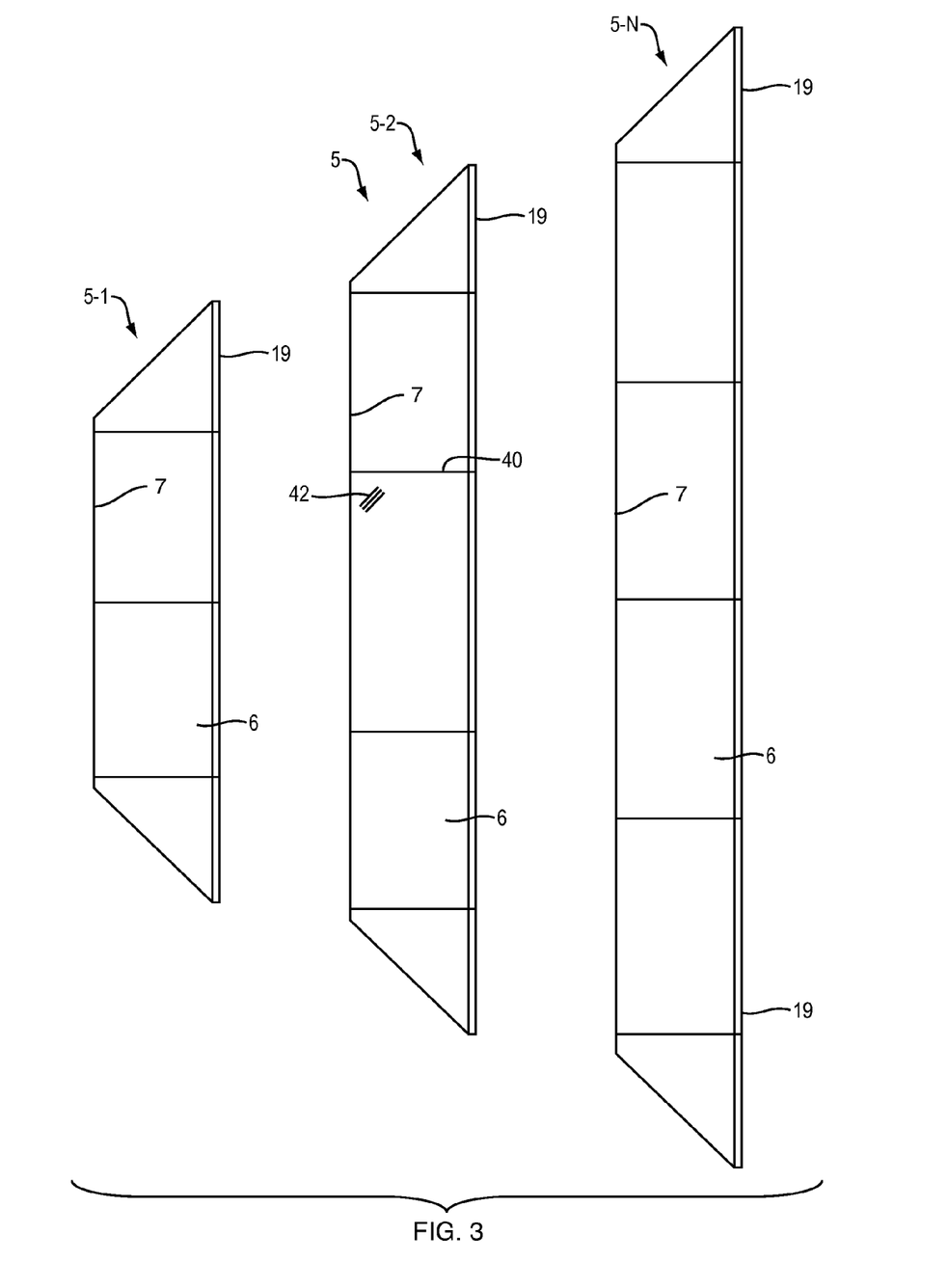
FIG. 3 illustrates a top view of a set of top lift panel systems of the augmenter system of FIG. 1.

With reference to FIG. 3, in the case where the top panel lift systems 5 are manufactured from a shrink wrap material, such as a polymer or plastic material, a manufacturer wraps one or more layers of a shrink wrap material 42, such as a shrink wrap film, to a top panel lift system frame 40 associated with each of the top panel lift system sections 6. The manufacturer applies heat to the shrink wrap material 42 to cause the material to shrink about the frame 40. With reference to FIG. 2, in the case where the side dump panels 4 are manufactured from a shrink wrap material, a manufacturer wraps one or more layers of a shrink wrap material 50 about a side dump panel frame 52. The manufacturer applies heat to the shrink wrap material 50 to cause the material to shrink about the frame 52.

Following the heating process, the shrink wrap material shrinks in size and becomes tight relative to the associated frame 40, 52. Accordingly, the relatively low cost shrink wrap material provides the top panel lift systems 5 and side dump panels 4 with a relatively firm and strong structure that minimizes an accelerated structural stress wear and tear on the panels 4, 5 particularly compared to conventional non-tightened materials when exposed to a relatively high wind area. While other low cost materials, such as canvas, can avoid excessive wear and tear if properly tightened, such tightening can be costly.

Figure 8:
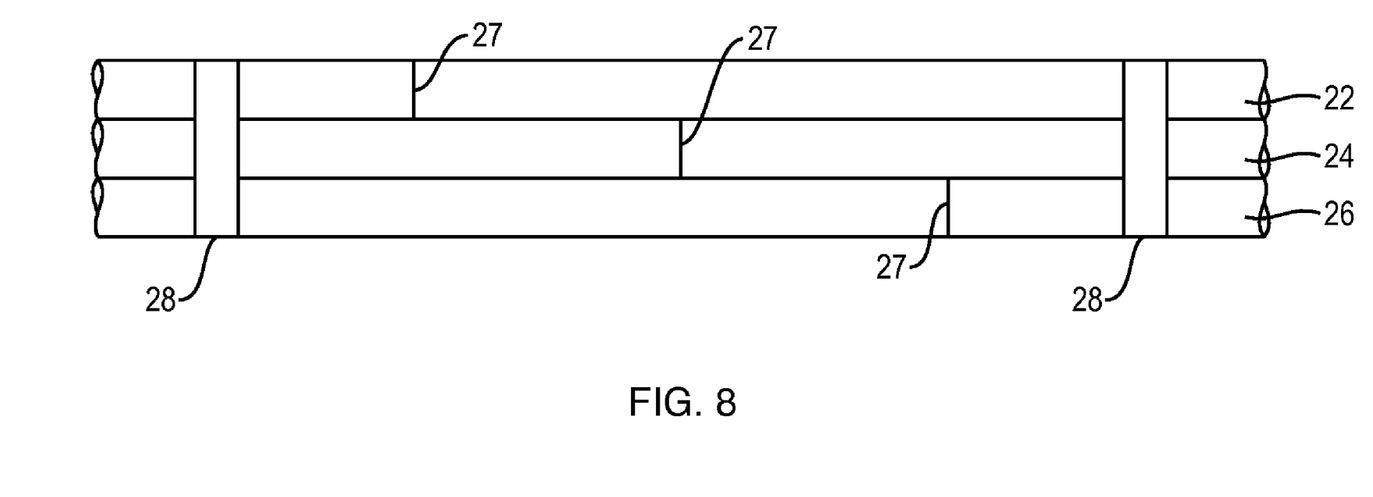
FIG. 8 illustrates a composite bamboo structure utilized as part of a frame of the augmented system, according to one arrangement.

In one arrangement, the frame 11 can also be formed from a lightweight durable material. For example, the frame can be formed from a steel material or from a bamboo material. In the case where the frame 11 is formed from a bamboo material, in order to minimize weakness found in the joints of individual bamboo rods, each frame element is formed from a set of three or more bamboo rods 22, 24, 26, as illustrated in FIG. 8. The rods 22, 24, 26 are arranged such that their respective bamboo joints are supported by a continuous (i.e., non-jointed) portion of the adjacent bamboo rod. The rods 22, 24, 26 are then laminated together and secured using securing portions 28, such as ratchet straps.

Figure 4:
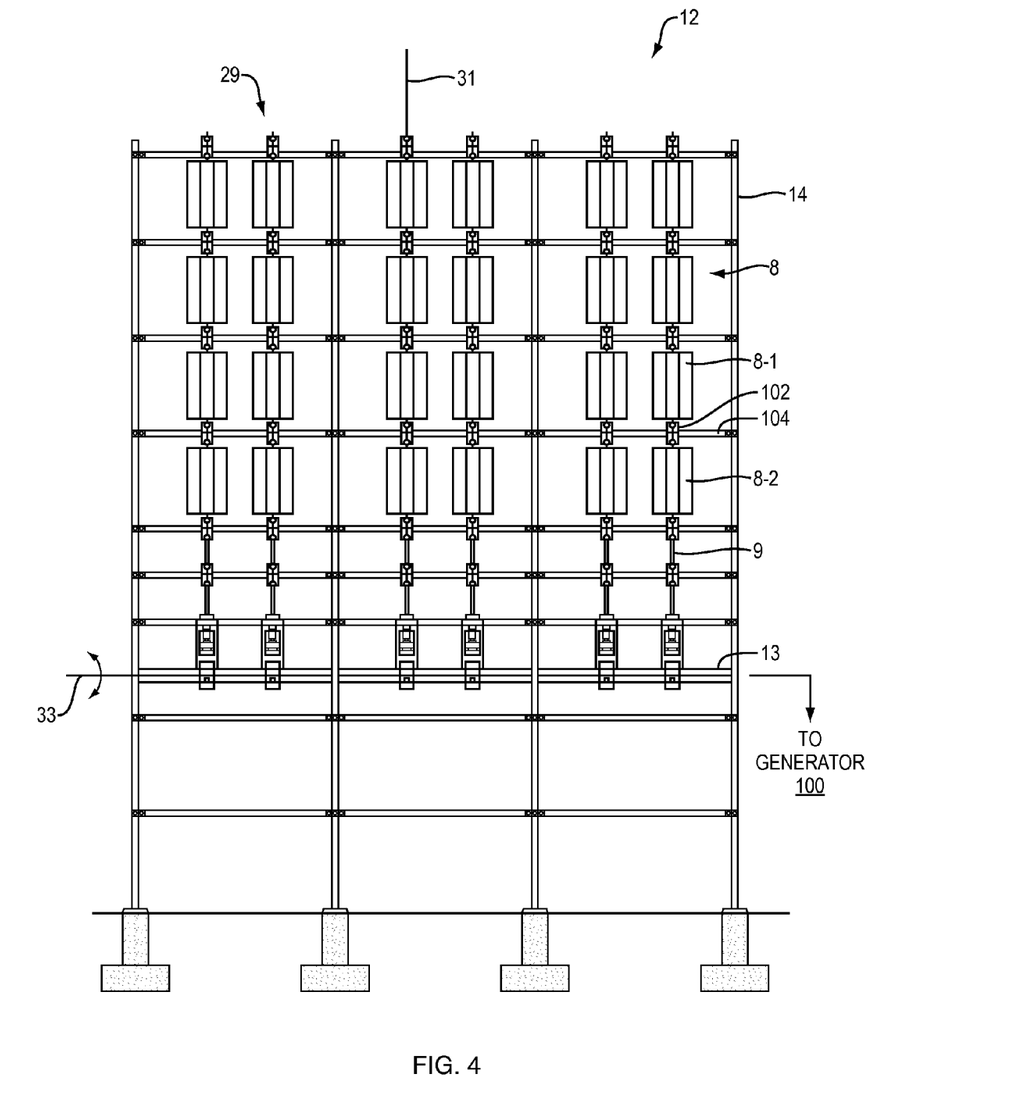
FIG. 4 illustrates a front view of a blade area of the augmenter system of FIG. 1.

In FIG. 4, a front view or active area of the blade system 12 is shown. The blade system 12 includes a plurality of impeller assemblies 29 carried by a frame 14. Each impeller assembly 29 includes one or more blades or impact impellers 8 disposed on a corresponding vertically arranged shaft 9 or connector. The shaft 9 is disposed in rotational communication with an output shaft 13 which, in turn, is coupled to a generator (not shown).

A bearing and bushing 102 is located at each intersection of shaft 9 and where it is supported by each of the cross (horizontal) structural members such as member 104. For example, bearing and bushing 102 is located between blades 8-1 and 8-2 where blade shaft 9 is coupled to horizontal member 104. This construction supports shaft 9 at a plurality of locations along its length (including between the turbines), thus leading to less vibration and wear of the shaft 9 and better coupling into and less wear of generator.

In one arrangement, each of the blades 8 is manufactured from a relatively lightweight material to reduce the moment of inertia of the blades 8.

The frame 14 includes side walls 21, as indicated in FIG. 7 to concentrate wind received from the first and second augmenters 15, 16 toward the impeller assemblies 29. The frame 14 can be manufactured from a variety of lightweight and structurally strong materials, such as steel or bamboo. The frame 14 can further include a roof member to covering the frame and to protect the shafts 9 and blades 8 from the elements.

During operation and in one arrangement, as wind flows through the wind inlet area 1 and the wind outlet area 3 of the second augmenter 16, through the blade system 12, and through the wind outlet area 3' and the wind inlet area 1' of the first augmenter 15, the wind rotates the impact impellers 8 about a longitudinal axis 31, thereby causing the corresponding shafts 9 to rotate about the axis 31. Rotational energy generated by the shafts 9 is transferred to, and causes rotation of, the output shaft 13. Rotation of the output shaft 13 relative to the generator causes the generator to produce electricity.

Every site has extreme wind events during some point of the annual weather cycle. These wind events provide an opportunity for the MAT wind power plant augmenter system 10 to produce the maximum amount of power that the traditional, horizontal axis generators cannot harness, including damage to traditional augmenter systems.

Figure 5:
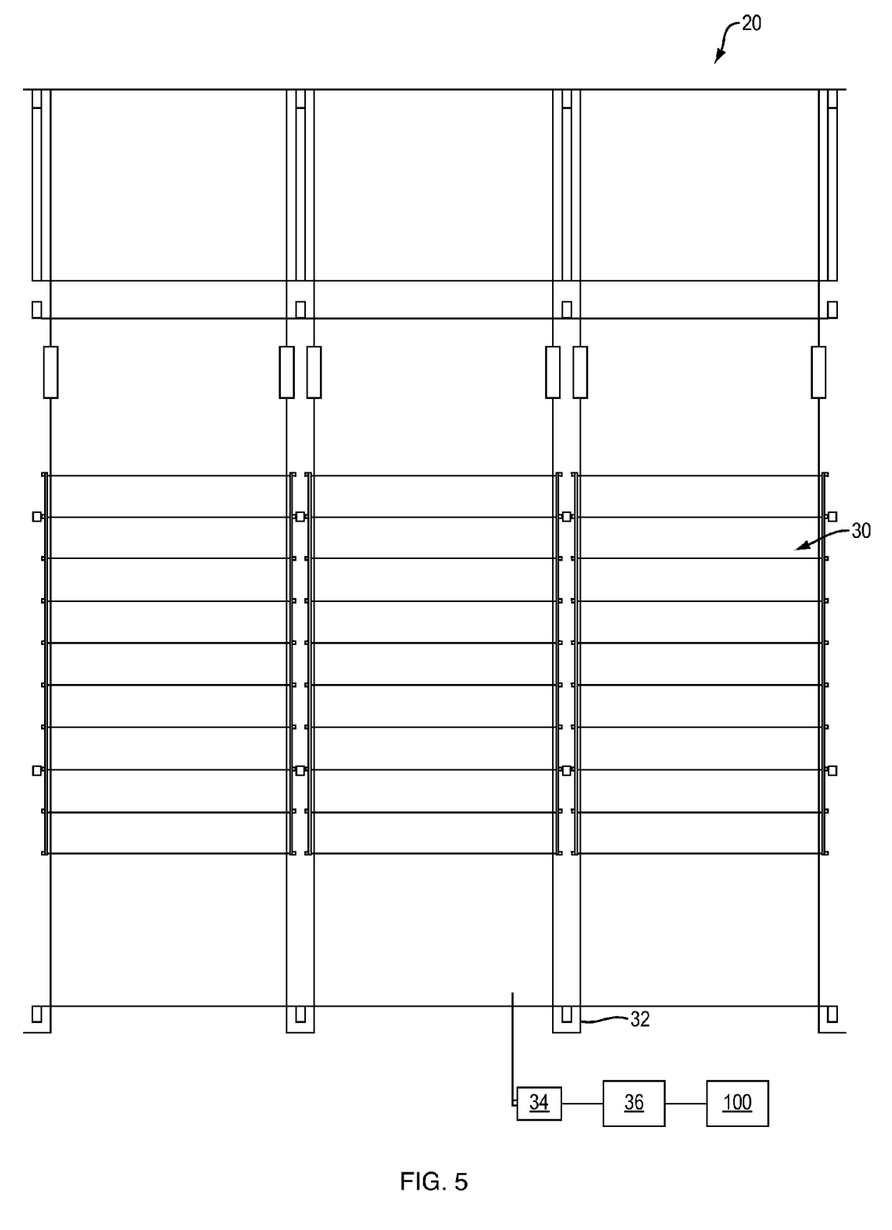
FIG. 5 illustrates a front view of a furling system of the augmenter system of FIG. 1.
Figure 6A:
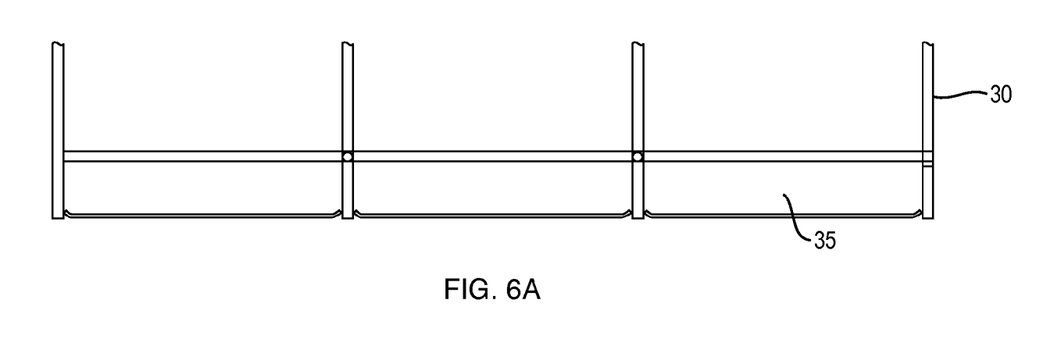
FIG. 6A illustrates a base portion of a wind blocking device of the augmenter system of FIG. 1.
Figure 6B:
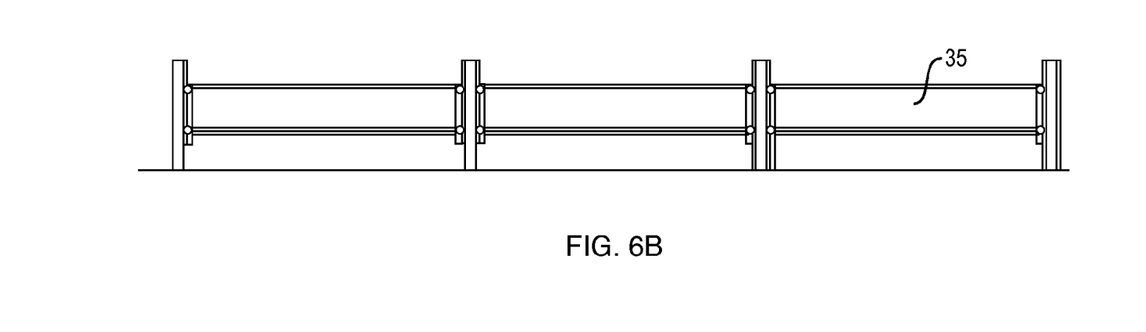
FIG. 6B illustrates a furling panel section of the wind blocking device of FIG. 6A.
Figure 6C:
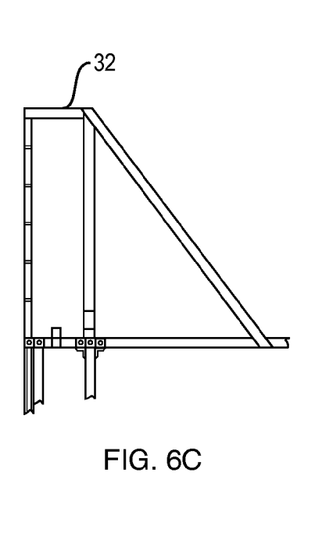
FIG. 6C illustrates an upper frame portion of the wind blocking device of FIG. 6A.

In certain cases, excessive wind velocity can damage the augmenter system 10. To minimize damage, in one arrangement, the augmenter system 10 includes a furling system 20, as illustrated in FIGS. 5 and 6. For example, the furling system 20 is disposed in proximity to the blade system 12 along the wind flow path between the wind inlet area 1 and the wind outlet area 3. The furling system 20 is operable to block the wind relative to the blade system 12 in order to prevent excessive and damaging output by the blade system 12 or generator. The furling system 20 is thus useful to act essentially as a speed limiter or governor for the blades 8 to prevent them from spinning the generator 100 too fast. An example of a furling system is explained in more detail below In one arrangement, referring to FIGS. 5, 6A, 6B, and 6C, the furling system 20 includes a wind blocking device, such as a furling door 30 having panels 35, carried by a frame 32. The furling door 30 is configured to be positioned on the frame 32 between an open position, allowing wind to flow into the blade system 12 and a closed position to minimize the flow of wind into the blade system 12. For example, the furling door 30 is connected to a furling motor 34 by a furling control shaft speed decreaser unit (not shown) such as a cable and pulley. A controller 36 determines the optimal amount of wind blockage for the blade system 12 and adjusts the position of the furling door 30 by using the furling control shaft speed decreaser unit. For example, the controller 36 is configured to determine the optimal wind velocity level for the generator (not shown) or other energy-producing device, such as an alternator, which is determined by the power output generated by the blade system 12 of the augmenter system 10.

The controller 36, in one arrangement, includes a normally open relay or diode at 12 volts. When open, the relay activates the furling motor 18 to cause lowering of the furling door 30, similar to a garage door. A normally closed relay or diode at 10 volts would activate the furling motor 18 in the direction of raising the furling door 30 when the relay or diode is opened at a rating below 10 volts.

In one arrangement, the controller 36, such as a memory and processor, is configured to operate the furling system 20 based upon feedback from the generator or power generating unit 100. In one arrangement, the generator 100 provides the controller 36 with an output signal, such as a power output rating, that is proportional to the power output created by the generator. In the case where the controller 36 detects the signal as indicating the generator 100 producing an excessive output rating, as compared to threshold such as a rated power output of the power generating unit, the controller 36 activates the furling motor 34 in the direction of lowering the furling door 30. For example, if the signal indicates the generator output is ten percent over the rated maximum, the controller 36 can cause the motor 34 to adjust the position of the furling door 30 so that ten percent of the blade system 12 is blocked. Alternatively, there can be a proportional feedback control that moves the door 30 appropriately. In the case where the controller 36 detects the signal as indicating the generator 100 as producing an output below its rated output, then the controller 36 would activate the furling motor 34 in the direction of raising the furling door 30. The gearing ratio for the speed decreasing unit, in one arrangement, is directly proportional to the height of the blade area 2 and the height of the furling door 30 (i.e., the total height of the furling panels).

As indicated above, and as illustrated in FIG. 4, the blade system 12 includes a set of vertically arranged impeller assemblies 29. In one arrangement, as illustrated in FIG. 9, the blade system 12 includes a set of horizontally arranged impeller assemblies 70 where each impeller assembly 70 includes one or more impellers 78 carried by a blade shaft 79 disposed in operative communication with an output shaft 73.

Figure 9:
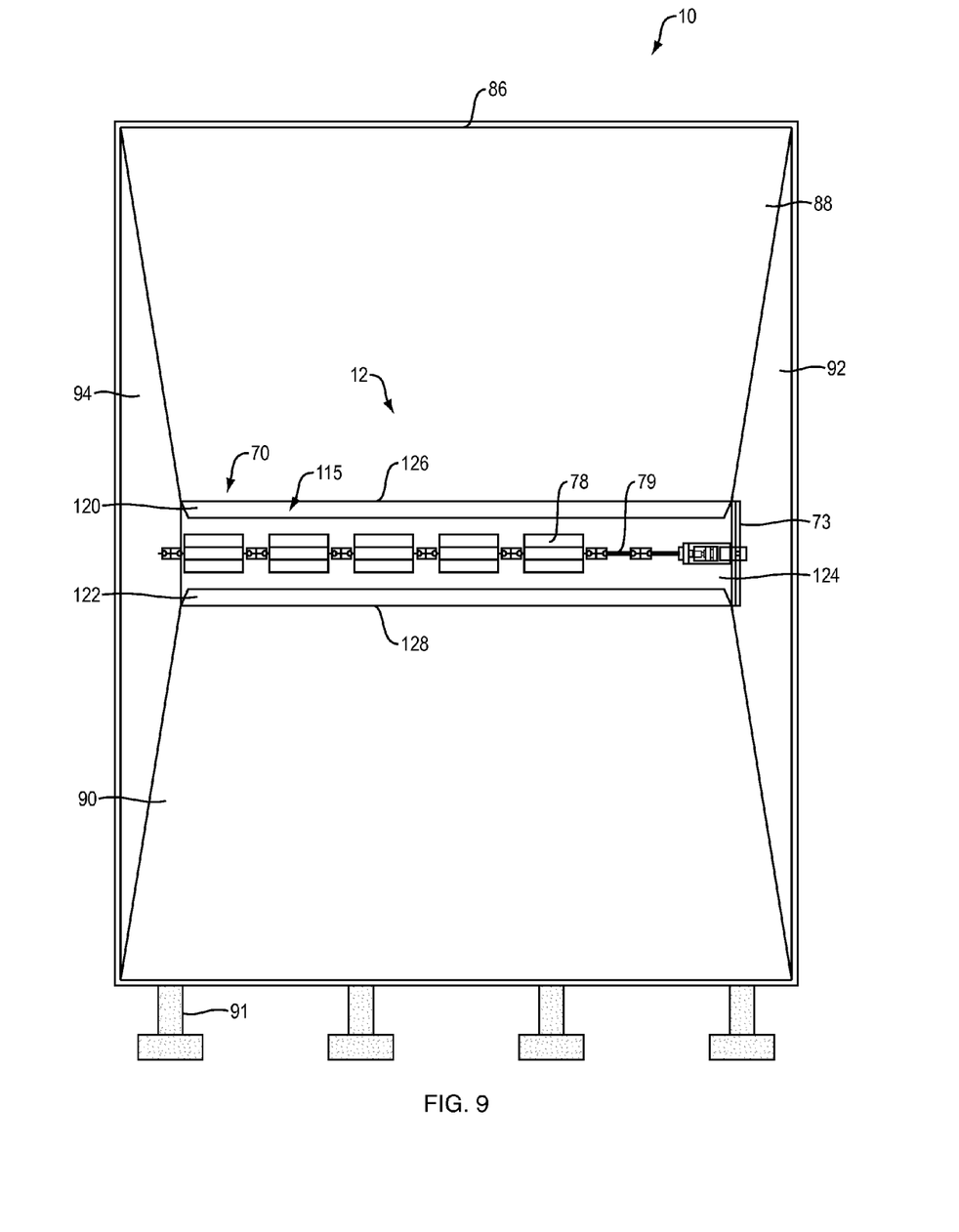
FIG. 9 illustrates an inlet side view of an arrangement of an augmenter element, according to one arrangement.

In one arrangement, as shown in FIG. 9, the augmenter system 10 is configured to direct wind toward the horizontally arranged blade or impeller assemblies 70 during operation. For example, as indicated in FIG. 9, the augmenter system 80 includes a first augmenter element (not shown) and a second augmenter element 86. Each of the augmenter elements includes a frame 91 and walls that are disposed at a tapered angle toward the impeller assemblies 70. For example, the augmenter element 86 includes a first wall 88 and a second wall 90 that are angled, relative to a horizontal reference, toward the impeller assemblies 70. For example, either one or both of the first and second walls 88, 90 are disposed at an angle of about 22 degrees toward the impeller assemblies 70 relative to a horizontal reference. Additionally, the augmenter element 86 includes a third wall 92 and a fourth wall 94. Either one or both of the third and fourth walls 92, 94 can be disposed at a tapered angle, such as an angle of about 22 degrees toward the impeller assemblies 70 relative to a vertical reference. Tapering of the walls 88, 90, 92, and 94 can accelerate the wind or air flow from the wind inlet area 1 toward the impeller assemblies 70.

The walls 88, 90, 92, and 94 can be manufactured from a variety of materials. For example, the walls 88, 90, 92, and 94 can be manufactured from a sheet metal skin or from a shrink wrap material disposed on frame 91. In one arrangement, the first wall 86 is configured as a set of top panel lift systems 5, as illustrated in FIG. 1, while the third and fourth walls 92, 94 are configured as side dump panels 4 as illustrated in FIG. 2.

In another arrangement, the augmenter element 86 is configured as an inflatable structure. For example, the walls 88, 90, 92, and 94 of the augmenter element 86 can be configured as helium or cold air balloons that, once inflated, direct and accelerate wind toward the impeller assemblies 70 during operation. With such an arrangement, the inflatable structure minimizes the set-up time associated with assembling non-inflatable wall portions of the augmenter.

Figure 10:
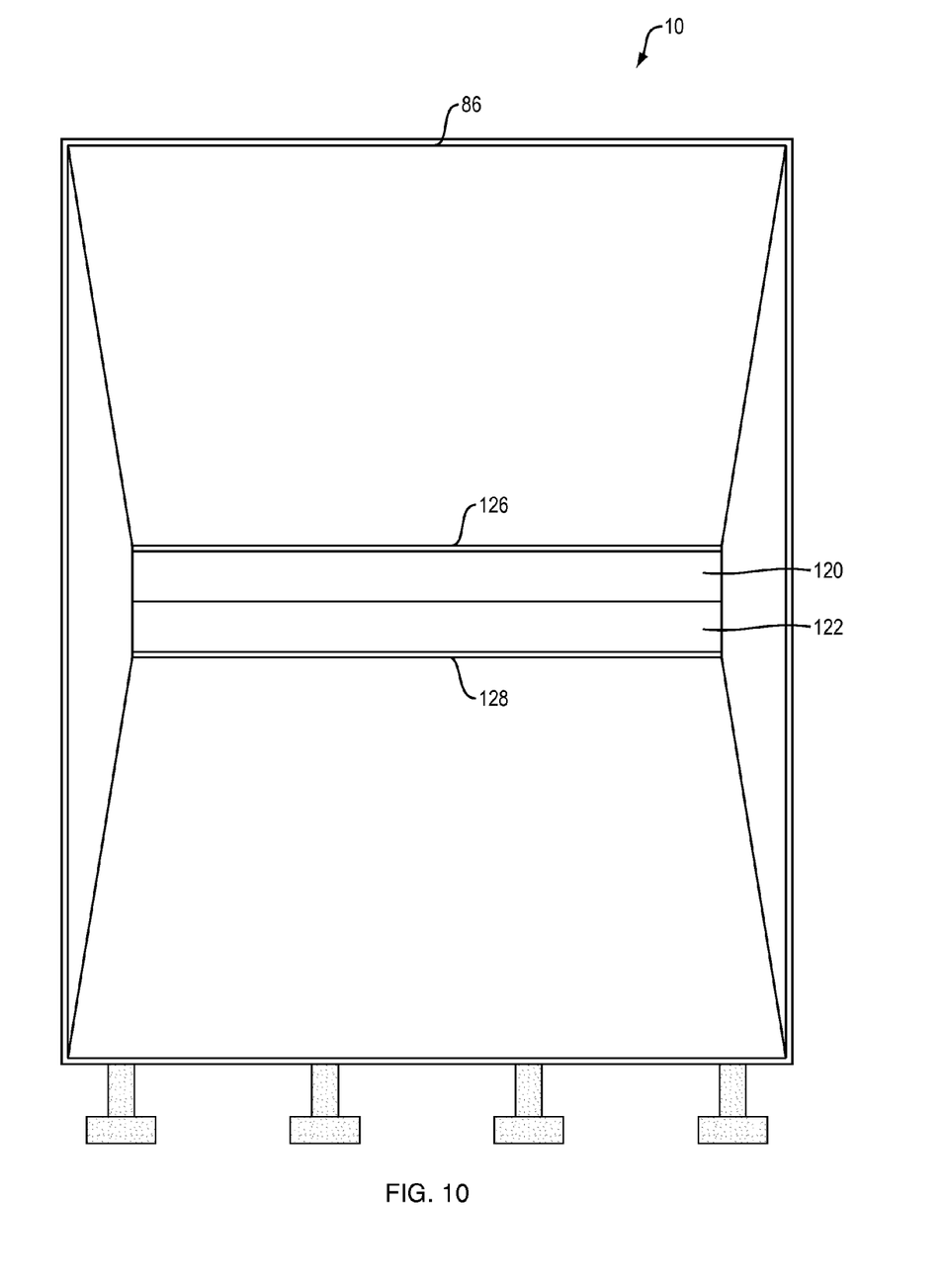
FIG. 10 illustrates the inlet side view of the augmenter element of FIG. 10.

As indicated above, the augmenter system 10 can utilize a furling system 20 to adjust the flow of wind to the blade system. In one arrangement, as illustrated in FIGS. 9 and 10, the augmenter system 10 includes a set of panels 115 disposed in proximity to an augmenter opening 124 to control the flow of wind to the blade system. For example, in the case where the augmenter element 86 is manufactured from a sheet metal skin, the set of panels 115 can include a first panel 120 and a second panel 122 hingedly coupled to the augmenter element 86 via hinges 126, 128, respectively. The first and second panels 120, 122 are configured to move from a closed position, as shown in FIG. 10, to an open position, as shown in FIG. 9, in response to wind flowing into the augmenter element 86 (i.e., along a direction substantially into the page) to the blade assemblies 70. With such an arrangement, the set of panels directs the wind toward the blade assemblies 70 during operation. In the case where wind flows from the blade assemblies 70 to the augmenter element 86 (i.e., along a direction that is substantially out of the page), the first and second panels 120, 122 are configured to move from the open position shown in FIG. 9 to a closed position shown in FIG. 10. Such a configuration allows the augmenter system 10 to concentrate the wind energy, as received from the opposing first augmenter element (not shown), toward the blade assemblies 70 and minimizes the flow of the wind through the augmenter element 86.

While the set of panels 115 can be positioned between an open and closed position using wind energy, in one arrangement, the position of each panel 120, 122 is controlled by a controller, such as a motor. In such an arrangement, the controller can independently position each of the panels 120, 122 to control both the volume of wind flow and the direction of wind flow to particular blade assemblies 70 in the system 10.

In one arrangement, a gearshift mechanism, such as a clutch, can be used to adjust the speed of the output shaft 13 and to allow optimal power output from the blade system 12 over a relatively wide range of wind velocities. Additionally, with the gearshift mechanism maintaining a particular speed of rotation of the output shaft 13, the clutch minimizes over-speeding of the output shaft 13. For example, with reference to FIG. 11, the blades 8 can be connected to a gearbox 85 having a gearshift mechanism 86, such as a magnetic clutch, coupled to the generator 100. During operation, the shaft connecting the blades 8 to the gearbox 85 would totally or partially disengage. Such disengagement minimizes or prevents an overheat or overspeed of the generator 100.

Figure 11:
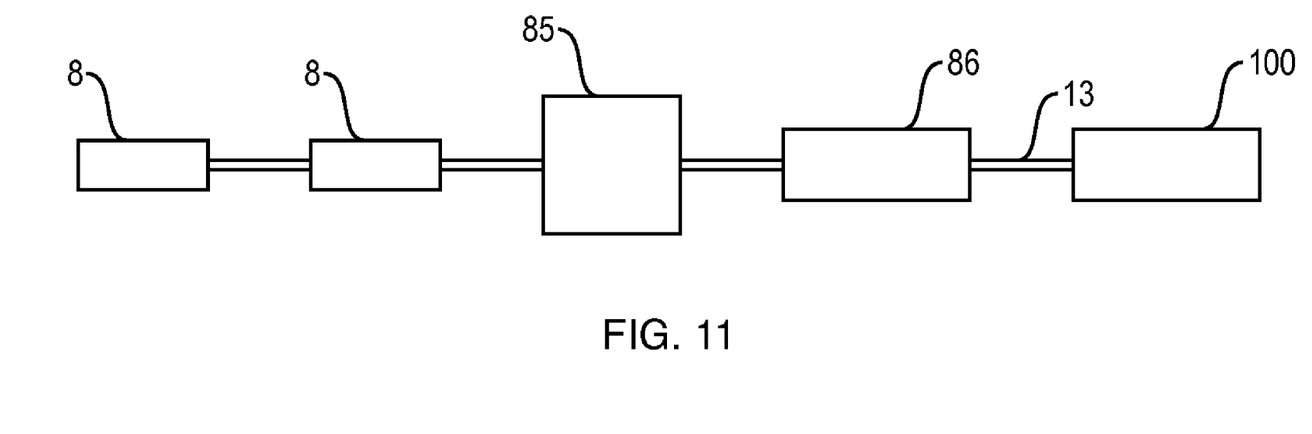
FIG. 11 illustrates a gearbox and gearshift mechanism, according to one embodiment.

In one arrangement, the gearshift mechanism 86, such as a clutch, can be directly connected to the generator 100 from the blades 8 or connected between the gearbox 85 and the generator 100. In an alternate arrangement, the gearshift mechanism 86 is disposed between adjacent blades 8 in order to achieve a particular power output over a relatively wide range of wind speeds. For example, the gearshift mechanism 86 can disengage or engage one or more blades 8 based upon the wind velocity to prevent the output shaft 13 from rotating in an overspeed situation (i.e., at a greater speed than the rated output of the generator). While the gearshift mechanism 86 can be configured as a clutch, in one arrangement, the gearshift mechanism 86 is configured as a transmission, such as an electronic transmission, to control the speed of the output shaft 13

Figure 12:
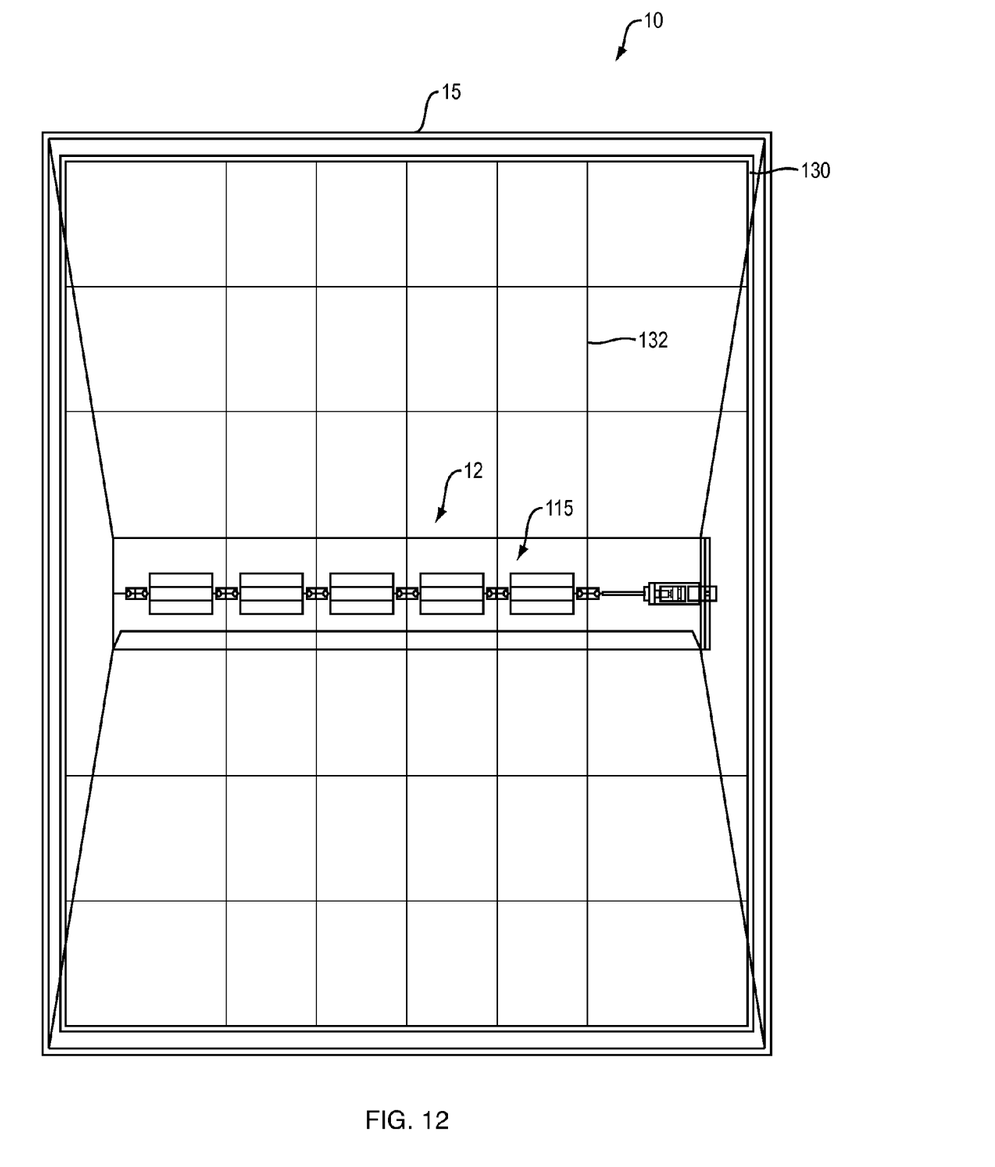
FIG. 12 illustrates an air straightener of the augmenter system of FIG. 1, according to one arrangement.

In one arrangement, augmenter system 10 can include an air straightener 130 to reduce air turbulence at the blades 8. For example, with reference to FIGS. 1 and 12, the air straightener 130 employs an open lattice-like structure 132, similar to that of a honeycomb or a wind prism, to minimize wind turbulence as the wind 60 enters the inlet area 1 of an augmenter element, such as augmenter element 15. The air straightener 130 directs the wind 60 through the augmenter element 15 such that the wind 60 flows substantially parallel to the walls of the lattice structure 132 and at a particular direction relative to the blades 8, such as a direction that is substantially perpendicular to the blades 8 of the blade system 12.

While various embodiments of the invention have been particularly shown and described, it will be understood by those skilled in the art that various changes in form and details may be made therein without departing from the spirit and scope of the invention as defined by the appended claims.

For example, as indicated above the controller 36, such as a memory and processor, is configured to operate the furling system 20 based upon power output rating feedback from the generator or power generating unit 100. Such description is by way of example only. In one arrangement, the controller 36 is configured to operate the furling system 20 based upon the operating speed of the generator 100.

For example, in the case where the controller 36 detects the generator 100 as operating at an excessive speed, such as a speed of 1810 RPM or greater based upon a reporting signal from the generator 100, the controller 36 activates the furling motor 34 in the direction of lowering the furling door 30. The controller 36 can then continuously detect the speed of the generator 100 (e.g., the reporting signal) and can stop lowering the furling door 30 when the generator speed reaches a threshold, such as a threshold of 1800 RPM. In the case where the controller 36 detects the reporting signal as indicating the generator 100 operating at a relatively low speed, such as a speed of 1790 RPM or lower, the controller 36 activates the furling motor 34 in the direction of opening the furling door 30. The controller 36 can then continuously detect the speed of the generator 100 (e.g., the reporting signal) and can stop opening the furling door 30 when the generator speed reaches a threshold, such as a threshold of 1800 RPM.

For example, if the signal indicates the generator output is ten percent over the rated maximum, the controller 36 can cause the motor 34 to adjust the position of the furling door 30 so that ten percent of the blade system 12 is blocked. Alternatively, there can be a proportional feedback control that moves the door 30 appropriately. In the case where the controller 36 detects the signal as indicating the generator 100 as producing an output below its rated output, then the controller 36 would activate the furling motor 34 in the direction of raising the furling door 30. The gearing ratio for the speed decreasing unit, in one arrangement, is directly proportional to the height of the blade area 2 and the height of the furling door 30 (i.e., the total height of the furling panels).

What is claimed is:

1. An augmenter system, comprising:
   at least one augmenter element having a frame and a set of walls carried by the frame, the set of walls defining a taper from a wind inlet portion to a wind outlet portion of the at least one augmenter element; and
   a blade system disposed in proximity to the wind outlet portion of the at least one augmenter element, the blade system having a frame, at least one blade shaft rotatably coupled to the frame, and set of blades coupled to the at least one blade shaft and adapted to be rotated by the wind, the at least one blade shaft being coupled to a generator by an output shaft.

2. The augmenter system of claim 1 wherein the at least one augmenter element comprises a first augmenter element and a second augmenter element, the first augmenter element defining a first wind path relative to an active area of the blade system and the second augmenter element defining a second wind path relative to the active area of the blade system, the first wind path opposing the second wind path.

3. The augmenter system of claim 1, wherein the set of walls comprises a set of top panel lift systems disposed between side walls defined by the frame and hingedly coupled to the frame, each top panel lift system being configured to rotate relative to the frame about the hinged coupling and lift above a subsequently disposed top panel lift system to vent wind to outside of the augmenter.

4. The augmenter system of claim 3, wherein the top panel lift system comprises a first top panel lift system, the first top panel lift system having a first set of panel components, the first set of panel components defining a taper from a wind inlet of the first top panel lift system toward a blade area of the augmenter system.

5. The augmenter system of claim 4, wherein each panel of the first set of panel components is disposed in a substantially coplanar manner such that the first set of panel components defines a slope angle relative to the ground and extending from the blade area toward the wind inlet area.

6. The augmenter system of claim 4, wherein the top panel lift system further comprises a second top panel lift system, the second top panel lift system disposed adjacent to the first top panel lift system and the second top panel lift system having a second set of panel components, the second set of panel components defining a taper from a wind outlet of the second top panel lift system toward the blade area of the augmenter system.

7. The augmenter system of claim 6, wherein each panel of the second set of panel components is disposed in a substantially coplanar manner such that the second set of panel components defines a slope angle relative to the ground and extending from the blade area toward the wind outlet area.

8. The augmenter system of claim 1 wherein the set of walls comprises:
   a first set of side wall dump panels hingedly coupled to a first side wall defined by the frame; and
   a second set of side wall dump panels hingedly coupled to a second side wall defined by the frame, the first set of side wall dump panels opposing the second set of side wall dump panels,
   the first set of side wall dump panels and the second set of side wall dump panels being configured to rotate relative to the frame about the corresponding hinged coupling to vent wind to outside of the augmenter.

9. The augmenter system of claim 1, further comprising a furling system having:
   a frame disposed in proximity to the blade system;
   a furling door carried by the frame; and
   a furling motor operatively coupled to the furling door, the furling motor configured to position the furling door between a first position and a second position, the first position exposing the blade system to the wind and the second position blocking the blade system from the wind.

10. The augmenter system of claim 9, wherein the furling system comprises a controller disposed in electrical communication with the furling motor, the controller configured to:
    detect a power output rating associated with a power generating unit;
    when the power output rating has a first value above a rated power output of the power generating unit, transmitting a signal to the furling motor to lower the furling door relative to the blade system to block the blade system from the wind; and
    when the power output rating has a second value below a rated power output of the power generating unit, transmitting a signal to the furling motor to raise the furling door relative to the blade system to expose the blade system to the wind.

11. The augmenter system of claim 1, wherein the at least one blade shaft rotatably coupled to the frame and the set of blades coupled to the at least one blade shaft are disposed vertically relative to the frame.

12. The augmenter system of claim 1, wherein the at least one blade shaft rotatably coupled to the frame and the set of blades coupled to the at least one blade shaft are disposed horizontally relative to the frame.

13. The augmenter system of claim 1, wherein the set of walls is formed from a shrink wrap material disposed on a wall frame.

14. The augmenter system of claim 1, wherein the set of walls is formed from an inflatable structure.

15. The augmenter system of claim 1, further comprising a wind straightener disposed in proximity to the at least one augmenter element.

16. The augmenter system of claim 1, wherein the at least one augmenter element comprises a set of panels having a first panel and a second panel hingedly coupled to the augmenter element and configured to move between a closed position and an open position in response to wind flowing into the augmenter element.

17. The augmenter system of claim 1, wherein the set of walls are flexible.

18. An augmenter system, comprising:
    a wall to capture, and funnel, wind into a wind power plant;
    the wall comprising a shrink wrap panel system with side wall dump panels and top panel lift systems configured to minimize structural stress, the side wall dump panels and top panel lift systems configured to move between a first position and a second position when a pressure exist between an inside and outside of the augmenter;
    the top panel lift system comprising a bracket that allows the suspension cable to lift above the next panel to vent wind to an outside of the augmenter;
    the wind power plant comprising:
    a frame structure supported on the ground and comprising a plurality of vertical elongated structural members connected by a plurality of horizontal elongated structural members, the tower structure forming a box-like structure with at least two active sides, and a plurality of vertical shafts located coextensively with the active sides of the frame structure, each shaft carrying a plurality of blades adapted to be rotated by the wind, each shaft is supported by a plurality of the horizontal structural members coupled to the shaft at spaced locations along the shaft, with one support location proximate the top of each shaft, one support location proximate the bottom of each shaft, and at least one support location intermediate the top and bottom support locations;

at least one electric generator; and an output shaft configured to connect each shaft to the at least one generator, to generate electricity from the wind energy.

19. The augmenter system of claim 18, further comprising a shaft bearing and a vibration absorbing component disposed between the shaft bearing and the horizontal structural member at each support location, to decrease transmission of vibration between the shafts and the frame structure.

* * * * *